United States Patent
Giovanni et al.

(10) Patent No.: US 11,153,118 B2
(45) Date of Patent: Oct. 19, 2021

(54) TECHNIQUE FOR EXECUTING A SERVICE IN A LOCAL AREA NETWORK THROUGH A WIDE AREA COMMUNICATION NETWORK

(71) Applicant: ORANGE, Issy-les-Moulineaux (FR)

(72) Inventors: Marc Giovanni, Chatillon (FR); Pierre Guigues, Chatillon (FR); Vincent Huet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 35 days.

(21) Appl. No.: 16/611,104

(22) PCT Filed: Apr. 26, 2018

(86) PCT No.: PCT/FR2018/051057
§ 371 (c)(1),
(2) Date: Nov. 5, 2019

(87) PCT Pub. No.: WO2018/202985
PCT Pub. Date: Nov. 8, 2018

(65) Prior Publication Data
US 2020/0153657 A1 May 14, 2020

(30) Foreign Application Priority Data
May 5, 2017 (FR) ...................................... 1753988

(51) Int. Cl.
| | |
|---|---|
| *H04L 12/46* | (2006.01) |
| *H04L 12/28* | (2006.01) |
| *H04L 29/08* | (2006.01) |

(52) U.S. Cl.
CPC ...... *H04L 12/4633* (2013.01); *H04L 12/2898* (2013.01); *H04L 67/16* (2013.01)

(58) Field of Classification Search
CPC ............. H04L 12/4633; H04L 12/2898; H04L 12/2834; H04L 67/16; H04L 67/34
See application file for complete search history.

(56) References Cited

U.S. PATENT DOCUMENTS

| | | | |
|---|---|---|---|
| 8,201,237 B1 * | 6/2012 | Doane | H04L 67/34 726/15 |
| 9,112,869 B2 * | 8/2015 | Casey | H04L 63/02 |
| (Continued) | | | |

FOREIGN PATENT DOCUMENTS

| | | |
|---|---|---|
| WO | 2010041996 A1 | 4/2010 |
| WO | 2016093723 A1 | 6/2016 |

OTHER PUBLICATIONS

International Search Report dated May 30, 2018 for corresponding International Application No. PCT/FR2018/051057, filed Apr. 26, 2018.

(Continued)

*Primary Examiner* — Min Jung
(74) *Attorney, Agent, or Firm* — David D. Brush; Westman, Champlin & Koehler, P.A.

(57) ABSTRACT

A technique for executing a service in a local area network through a wide area communication network by way of an access gateway. This access gateway allows devices of the local area network to access the wide area communication network. A service tunnel is configured between the access gateway and a tunnels termination point. This termination point conveys data originating from the local area network and received by using the tunnel to an instance of the service specific to the local area network and conveys data received from this instance to the local area network by using the tunnel. The service is thereafter executed by this instance in the guise of device of the local area network.

13 Claims, 4 Drawing Sheets

(56) References Cited

U.S. PATENT DOCUMENTS

| | | | | |
|---|---|---|---|---|
| 2015/0092551 | A1* | 4/2015 | Moisand | H04L 67/146 |
| | | | | 370/235 |
| 2016/0234231 | A1* | 8/2016 | Stan | H04W 76/12 |
| 2017/0026231 | A1* | 1/2017 | Poosala | H04L 41/0803 |
| 2017/0208039 | A1* | 7/2017 | Godfrey | H04L 63/029 |
| 2018/0262465 | A1* | 9/2018 | Maattanen | H04W 12/068 |
| 2018/0295156 | A1* | 10/2018 | Kolbe | H04L 61/2015 |

OTHER PUBLICATIONS

English translation of the International Written Opinion dated Jun. 6, 2018 for corresponding International Application No. PCT/FR2018/051057, filed Apr. 26, 2018.

* cited by examiner

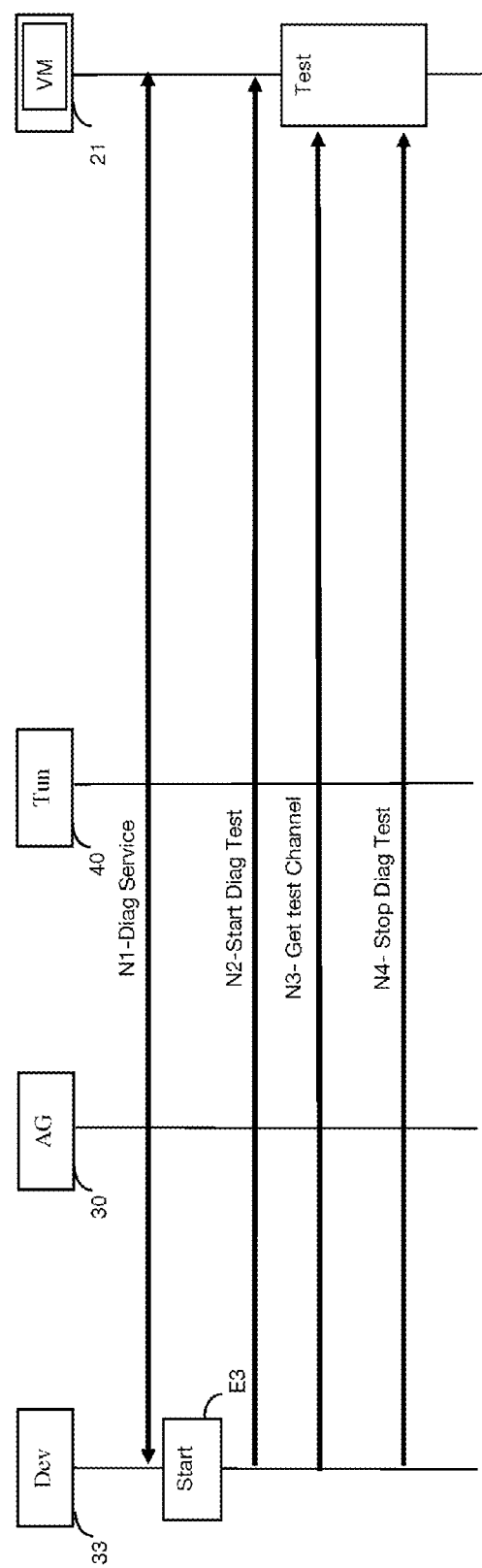

TECHNIQUE FOR EXECUTING A SERVICE IN A LOCAL AREA NETWORK THROUGH A WIDE AREA COMMUNICATION NETWORK

CROSS-REFERENCE TO RELATED APPLICATIONS

This application is a Section 371 National Stage Application of International Application No. PCT/FR2018/051057, filed Apr. 26, 2018, the content of which is incorporated herein by reference in its entirety, and published as WO 2018/202985 on Nov. 8, 2018, not in English.

FIELD OF THE DISCLOSURE

The invention pertains to the general field of telecommunications.

The invention relates more particularly to a technique for executing a service in a local area network. More precisely, an instance of the service specific to the local area network executes the service remotely, in the guise of device of the local area network.

BACKGROUND OF THE DISCLOSURE

In a local area network, an access gateway allows, in particular, devices located in a client site to access a WAN (for "Wide Area Network") wide area communication network, such as the Internet network. The client site corresponds for example to a company, a residence. These devices correspond for example to a TV decoder or "Set-Top-Box", a Voice over IP (or VoIP) terminal, a mobile terminal. This local area network is thus linked to the wide area communication network by way of the access gateway.

These access gateways are administered by the communication network operator. Their software is updated in a regular manner on command of the operator. To implement a new service in the local area network, it is necessary to update the software of the access gateway. However, certain services may be required in a patchy manner for example for a maintenance operation affecting a particular access gateway. The current scheme for the administration and design of access gateways does not make it possible to introduce a service into a local area network on demand.

SUMMARY

One of the aims of the invention is to remedy inadequacies/drawbacks of the prior art and/or to afford improvements thereto.

According to a first aspect, the subject of the invention is a method for executing a service in a local area network through a wide area communication network, by way of an access gateway allowing devices of the local area network to access the wide area network.

This method comprises:
configuration of a service tunnel between the access gateway and a tunnels termination point, said termination point routing data originating from the local area network and received by means of the tunnel to an instance of the service specific to the local area network and routing data received from said instance to the local area network by means of the tunnel;
execution of said service by said instance in the guise of device of the local area network.

By instance of a service specific to the local area network is meant hereinafter a software resource intended to execute the service in the local area network.

The method thus relies on a service tunnel configured between the access gateway and a tunnels termination point in the operator's network. This service tunnel allows interconnection between the local area network and the infrastructure of the operator and allows data transfer between the local area network and the service instance specific to the local area network at the level of the data link layer (corresponding to level 2 in the OSI model). The service tunnels termination point makes it possible to aggregate service tunnels established from access gateways. It connects a service tunnel corresponding to a client context with the instance of the service specific to the local area network, optionally through a wide area communication network, thus making it possible to execute the service in the local area network thus extended. The instance of the service specific to the local area network is then completely integrated into the local area network and thus has access to the majority of the data carried in the local area network, as if it were connected to a switch of the local area network. The instance of the service specific to the local area network can then interact with the devices of the local area network. This method makes it possible to add a service on demand and in real time so as to execute the latter in the local area network as if it were executed on one of the devices of the local area network. This is made possible by the extension of the local area network up to the operator infrastructure. This instance of the service specific to the local area network executes on a physical device located in the wide area communication network, which is therefore situated remotely from the local area network.

It is thus noted that this technique affords the operator great flexibility in setting up and providing a service in the local area network and also for the user who can benefit from this service. This technique is compatible with the access gateways currently deployed in the operator's local area networks, if they are able to establish a service tunnel. No major updating of their firmware is required. Only a minor updating allowing the access gateways to manage the service tunnel is required, if relevant. This simply involves a configuration operation. As a function of the service, the data forwarding or routing and IP address translation functions can remain implemented by the access gateway. This does not involve reviewing the architecture of the access gateways or offloading all of the functions and services of the access gateway in the operator's infrastructure; it involves offloading just a part of the functions as a function of the service to be executed. The access gateway continues to operate in so-called routed mode, without modification of its architecture. Moreover, as this instance is specific to a client and to a local area network, this guarantees an isolation between the various local area networks. The service instances specific to a local area network are located remotely from the local area network from the operator's infrastructure equipment. It is then possible to tailor the necessary hardware resources as a function of the demands, with no impact on the access gateways.

In a particular embodiment, this instance of the service specific to the local area network is a virtualized instance of the service, created on a physical machine in a computing system in the infrastructure of the operator.

In another particular embodiment, this instance of the service specific to the local area network is created on a physical machine of the network operator, able to implement the service for various local area networks.

The various embodiments or features mentioned hereinafter can be added independently or in combination with one another, to the steps of the method for executing a service in a local area network such as defined above.

In a particular embodiment, the method for executing a service furthermore comprises a provision by a control device of parameters of connection to a transport network specific to the local area network, making it possible to route data between said instance and the termination point.

By transport network specific to the client is meant the resources established or configured in the operator infrastructure network making it possible to connect the termination of the service tunnel and the instance of the service specific to the local area network.

The control device allows the service tunnels termination point to identify the access gateway which transports the data and to associate with it an instance of the service corresponding to the client context. It also makes it possible to set up the transport network serving to connect the service tunnel termination with the instance of the service specific to the local area network. This makes it possible to route data from the local area network to the service instance specific to the local area network and vice versa.

For example, the control device is an orchestration device and the transport network is set up with the aid of a network controller.

In a particular embodiment, the method for executing a service furthermore comprises an allocation by the access gateway of an address in the local area network to said instance.

On startup, the instance of the service specific to the local area network initiates an address allocation procedure, for example with the aid of the DHCP (for "Dynamic Host Configuration Protocol") protocol. The query and response messages are routed in a transparent manner by means of the service tunnel to and from the access gateway. An address in the local area network is then allocated to the instance of the service in the same manner as to a device of the local area network. Once the address has been allocated to the instance of the service, the access gateway routes data intended for this address by way of the service tunnel and receives by way of the service tunnel data having this allocated address as source address, so as to route them to devices of the local area network or of the wide area communication network.

The instance of the service specific to the local area network is thus integrated into the local area network at the level of the network layer, as a device of the local area network. It thus has access to all of the services present in the local area network and can also access the wide area communication network through the access gateway.

By way of illustrative example, a user encounters problems in the reception of the IPTV (for "Internet Protocol Television") streams in his local area network. An instance of the service corresponding to a decoder of the IPTV streams which is specific to the local area network can be configured and an address in the local area network can be allocated to it. This instance of the service can then operate in the same manner as the IPTV stream decoder of the local area network and perform tests which will allow a client advisor to assist the user in identifying and thereafter resolving the problems encountered.

In a particular embodiment, the service tunnel is configured in a permanent manner between the access gateway and the termination point of the service tunnels. This makes it possible to decrease the time required to be able to execute the service.

In a particular embodiment, the tunnel is configured by the access gateway when the service has to be executed.

This makes it possible to limit the use of the resources in the operator's network when no service is required.

In a particular embodiment, the method for executing a service comprises a creation by a control device of said instance as a function of a request for execution of the service.

The instance of the service specific to the local area network is thus created on request as a function of the needs of the user, of a client advisor or else of a maintenance technician or of any other authorized third-party or software. This makes it possible to adapt to the service execution requests and to be able to implement services patchily in the wide area network as if they were executing locally. Economies are made with regard to the resources of the physical machine for the computing system in the operator infrastructure.

In a particular embodiment, the service corresponding to a string of services, a routing rule is configured on the access gateway to route along the tunnel data emitted by a device of the local area network under control.

This makes it possible to implement a service for a particular device of the local area network. By way of illustrative example, an access control, for example parental, is requested for a device of the local area network. The routing rule makes it possible to route in the service tunnel just data sent by this device. Thus, the instance of the service can implement the access control and thereafter transmit the data controlled directly (that is to say without traveling through the access gateway) to the wide area communication network after having performed an address translation.

In a particular embodiment, to form a multi-site local area network interconnecting said local area network and another local area network, said instance implements a switch function allowing the routing of the data between the sites.

It is thus possible to access a device of one of the local area networks from another device of the other of the local area networks. By way of illustration, the user of one site can discover and access a networked storage server, known by the name NAS (for "Network Attached Storage") server situated on the other site.

According to a particular characteristic, said instance furthermore implements an address allocation function.

According to a second aspect, the invention also relates to a system for executing a service in a local area network through a wide area communication network. This system comprises:
 an access gateway allowing devices of the local area network to access the wide area network, said gateway comprising a configuration module, designed to configure a service tunnel with a service tunnels termination point;
 said termination point comprising:
  a configuration module, designed to configure the service tunnel with the access gateway and
  an association module, designed to route data originating from the local area network and received by means of the tunnel to an instance of the service specific to the local area network and to route data received from said instance to the local area network by means of the tunnel.

The advantages stated in respect of the method for executing a service according to the first aspect are directly transposable to the system.

In a particular embodiment, the system furthermore comprises a control device, said device comprising:

a command module, designed to provide to said instance parameters of connection to a transport network specific to the local area network, making it possible to route the data between said instance and the termination point.

In a particular embodiment, the system furthermore comprises a control device, said device comprising a virtualization module, designed to create the instance specific to the local area network in virtualized form as a function of a request for execution of the service.

In a particular embodiment, the access gateway furthermore comprises a module configured to classify and route along the tunnel data emitted by a device of the local area network under control as a function of a routing rule.

According to a third aspect, the invention relates to a program for a device, comprising program code instructions intended to command the execution of those of the steps of the above-described method for executing a service that are implemented by the device, when this program is executed by this device and a recording medium readable by a device on which is recorded a program for a device.

The advantages stated in respect of the method for executing a service according to the first aspect are directly transposable to the program for a device and to the recording medium.

BRIEF DESCRIPTION OF THE DRAWINGS

The invention will be better understood with the aid of the following description of particular embodiments of the technique for executing a service, with reference to the appended drawings in which:

FIGS. 2a and 2b illustrate steps of a method for executing a service according to particular embodiments;

DETAILED DESCRIPTION OF ILLUSTRATIVE EMBODIMENTS

Figure 1:
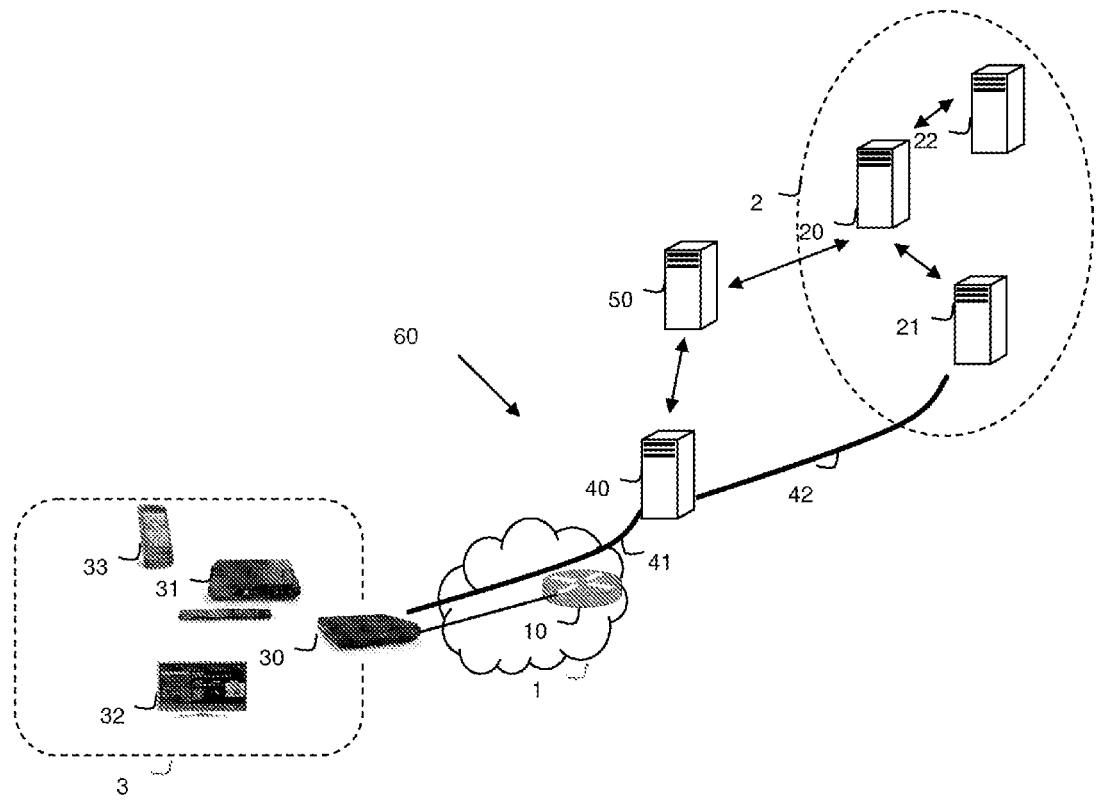
FIG. 1 represents a local area network and its environment, in which the technique for executing a service according to a particular embodiment is implemented.

FIG. 1 represents a private or local area communication network 3. The IP (for "Internet Protocol") protocol is used by the devices in the local area network to communicate with one another and also to communicate with an extended or WAN (for "Wide Area Network") communication network, such as the Internet network. The IP protocol may equally well be version 4 (IPv4) or version 6 (IPv6).

For the environment represented in FIG. 1, by local area communication network 3 is meant a network of LAN ("Local Area Network") type. This network may be in particular a domestic network or a company network. An access gateway 30 is designed to provide access to the wide area communication network (for example the Internet network) to devices of the local area network 3 by way of an access network 1 or collection network. The access gateway 30 thus allows devices 31-33 of the local area network 3 to access the wide area network. The access gateway 30 ensures the routing of the data between the access network 1 and the local area network 3. It involves for example a domestic gateway or else a company gateway. The access network 1 is for example an xDSL access network (DSL standing for "Digital Subscriber Line", the x indicating that it may involve a network such as ADSL, HSDL, VDSL, ... ). It may also involve an FTTH (for "Fiber To The Home") network or a mobile network such as a 3G or 4G network. No limitation is attached to the type of the access network 1, nor to the type of protocol used. Such a protocol may be for example PPPoE for "Point-to-Point Protocol over Ethernet", IPoE for "Internet Protocol over Ethernet".

The devices 31-33 of the local area network 3 can be any devices, for example domestic, having a wired or wireless network connection. By way of illustrative examples, various devices are represented in FIG. 1. It may involve for example a TV decoder 31 ("Set-Top Box"), a connected television 32 (known by the name "smart TV"), a mobile terminal 33.

The local area network 3 can comprise a wireless radio access network of Wi-Fi type, according to the IEEE 802.11 standard "Wireless LAN Medium Access Control (MAC) and Physical Layer (PHY) Specifications" (802.11a/b/g/n/ac and others). The access gateway 30 is designed to communicate with some of the devices, for example the mobile terminal 33 of the local area network by way of the radio access network. The devices of the local area network can access the wide area communication network (Internet network) by way of the access gateway and of the access network 1. The exchanges between these devices 31-33 are performed by way of the access gateway 30.

No limitation is attached to the number of these devices 31-33 (within the limit of the number of allocatable IP addresses in the local area network), nor to the types of these devices.

In FIG. 1, an access point 10 located in the operator's collection network 1 serves as point of attachment of the access gateway. It makes it possible to route data to the wide area communication network. In FIG. 1 a termination point 40 of service tunnels established with access gateways is also represented. In a particular embodiment, the tunnels termination point 40 is hosted in a point of presence PoP of the operator. It is configured to interconnect or associate a tunnel, termed a service tunnel, with a physical device situated in the infrastructure of the operator, accessible via the wide area communication network. Hereinafter, a software resource intended to execute the service in the local area network is called an instance of a service specific to the local area network. In a particular embodiment, represented in FIG. 1, this involves a physical machine 21, 22 intended to implement a virtualized instance of the service specific to the local area network administered by the operator. In another particular embodiment, it involves a physical machine, able to implement the service for a given local area network by creating an instance of the service specific to the local area network per client. This physical machine can be a server, a computer, .... In a particular embodiment, the service tunnel is a GRE (for "Generic Routing Encapsulation") or else VxLAN (for "Virtual Extended Local Area Network") tunnel or one in respect of any other protocol allowing the transport of Ethernet frames inside an IP protocol, such as a level 2 virtual private network. No limitation is attached to the type of tunnel. It is emphasized here that several points of termination of service tunnels may be deployed by the network operator.

A control device 50 is designed to control setup of the hardware and software means necessary for the execution of the instance of the service specific to the local area network.

More precisely, the control device 50 is designed to communicate in the control plane with the termination point 40 and with a device intended to execute an instance of the service specific to the local area network, so as to associate in the transport plane the termination point 40 with this device. The control device 50 implements in particular a management and orchestration function (for example such as MANO for "Management & Orchestration"). In the embodiment represented in FIG. 1, the control device 50 communicates with a command device 20 of a virtualized infrastructure 2 so as to associate the termination point 40 with physical machines 21, 22 implementing the virtualized instance of the service. No limitation is attached to the number of command devices of the virtualized infrastructure and of physical machines.

In another embodiment, the control device 50 communicates with a physical machine, able to execute this service. More precisely, an instance of the service specific to a local area network can be created on this physical machine under the command of the control device 50. No limitation is attached to the number of physical machines.

In the environment represented in FIG. 1, the tunnels termination point 40 and the instance of the service specific to the local area network communicate by way of a transport network 42 specific to the client. By transport network specific to the client is meant the resources established or configured in the operator infrastructure network allowing communication between the termination of the service tunnel and the instance of the service specific to the local area network. This transport network 42 is for example identified by a unique identifier at the network operator and associated with the client. In other environments, the instance of the service specific to the local area network is co-located with the termination point 40. In this case, no transport network is necessary, simple local connectivity being set up.

The access gateway 30 has an access to the wide area communication network. An address in the IP network is associated with it and allows it to be reached from other devices connected to the wide area communication network and to communicate to such other devices. An address of this type is known by the term public address when the IPv4 protocol is involved or the term global address (GUA for "Global Unique Address") when the IPv6 protocol is involved.

In the embodiment represented in FIG. 1, the command device 20 of the virtualized infrastructure is in particular designed to create, delete and manage virtualized instances (or virtual machines) sitting on the physical machines 21, 22. The command device 20 and the virtualized instances make it possible to provide a software application deployed in a computing system in the operator infrastructure. The computing-type environments in the operator infrastructure are particularized into three major levels of offer according to the type of resource made available. The aim of the "Infrastructure as a Service" (IaaS) level is to make it possible to access virtualized hardware resources (calculation, storage, network) relying on a set of physical hardware resources. The "Software as a Service" (SaaS) layer is aimed at exposing software applications destined for the end users. The "Platform as a Service" (PaaS) intermediate layer offers a set of tools and execution environments which make it possible to manage the life cycle of the applications. One of the main benefits of virtualization is to allow consolidation of the hardware resources by pooling. This consists in simultaneously implementing a set of hardware resources which are virtualized at the level of a common physical hardware infrastructure (i.e. several virtual machines executing on one and the same physical machine). The IaaS level is considered hereinafter. By way of illustrative example, the manager of virtualized instances (or VIM for "Virtual Instance Manager") is Openstack, harnessing its Nova module and the libvirt library for the virtualization layer.

The technique for executing a service in a local area network through the wide area communication network will now be described in a more precise manner in particular embodiments in the environment of FIG. 1 in conjunction with FIGS. 2a and 2b.

Figure 2A:
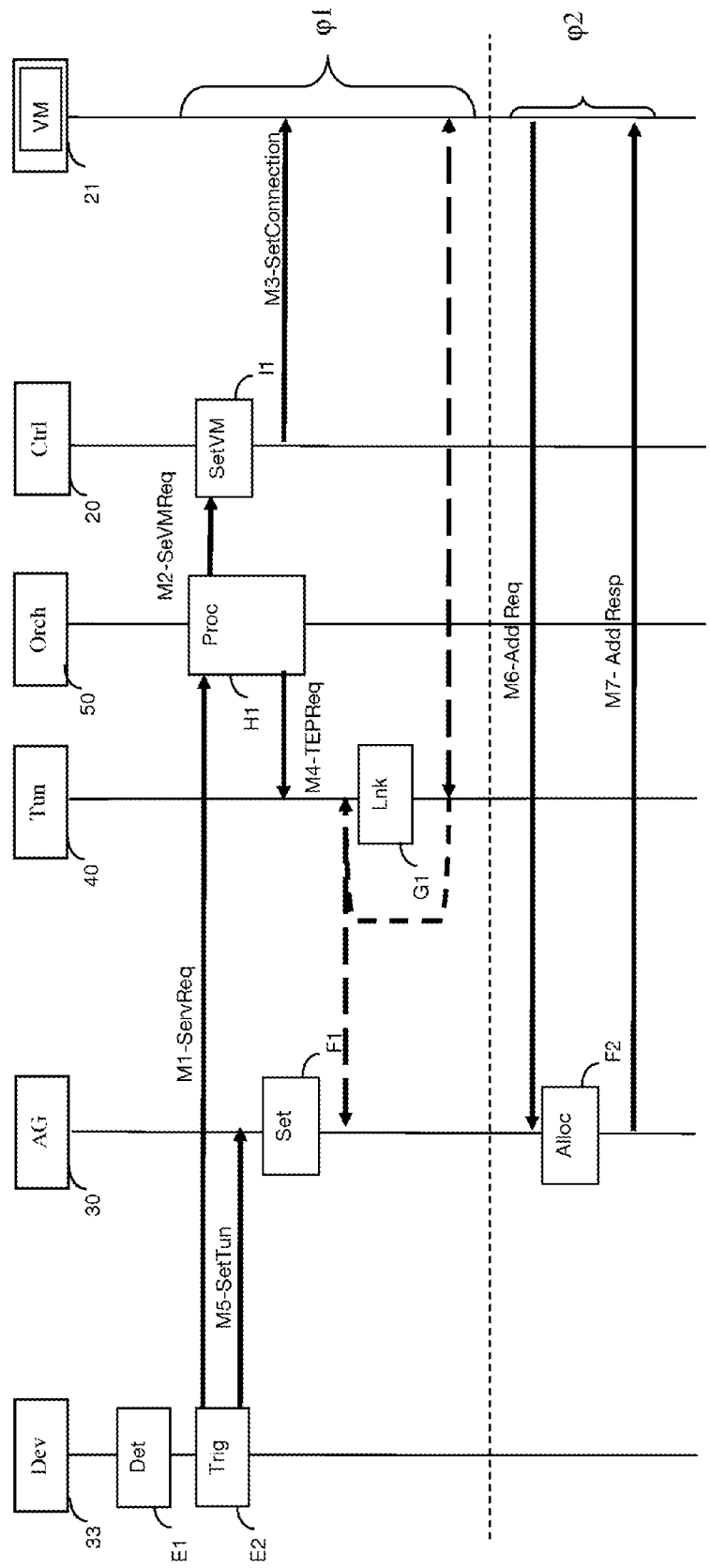

FIG. 2a describes more precisely the exchanges between a command terminal, the access gateway 30, the service tunnels termination point 40, the control device 50, the command device 20 of the virtualized infrastructure and a virtualized instance in the physical machine 21 in a particular embodiment.

Considered hereinafter is a particular embodiment where the command terminal is the mobile terminal 33, on which an application for management of the access gateway 30 is executing. Such an application corresponds for example to the "My Livebox" application offered to its clients by the operator Orange. It makes it possible in particular to perform tests and diagnoses when requested by a user.

In a step E1, a fault is detected in the execution of a service.

A phase $\varphi 1$ of integration into the local area network of an instance of a service specific to the local area network and located in the wide area communication network begins. More precisely, the case of a diagnostic service is considered hereinafter.

In a step E2, the application executing on the mobile terminal 33 triggers the actions to set up a diagnostic environment. More precisely, the application sends a message M1 requesting provision of a diagnostic service for the local area network, for example as a function of the fault detected, destined for the control device 50. Still in this step E2, the application triggers a configuration of a service tunnel 41 between the access gateway 30 and the service tunnels termination point 40. More precisely, the application sends a message M5 to the access gateway 30 requesting establishment of a service tunnel. In another embodiment, the establishment of the service tunnel is triggered by the control device 50 during the processing of the request M1. In yet another particular embodiment, the establishment of the service tunnel is triggered by an administration device, for example from an administration server, called ACS (for "Auto-configuration Server") remote auto-configuration server.

In a step H1, the control device 50 receives and processes the message M1 requesting provision of a diagnostic service for the local area network. Still in this step H1, the control device 50 commands the command device 20 through a message M2 to create an instance of the service requested specific to the local area network, for example for the embodiment described, an instance virtualized in a physical machine 21 so as to execute a diagnostic service in the local area network 3. The message M2 comprises in particular the parameters necessary for a connection to the transport network 42 of the instance of the service specific to the local area network with the termination point 40. The local area network 3 is for example identified by an identifier which is unique at the network operator and specific to the client.

In a step I1, the command device 20 creates a virtualized instance of the service on the physical machine 21 and requests through a message M3 the virtualized instance to establish a connection with the termination point 40 by way of the transport network 42 for an execution of the service in the local area network 3. In a particular embodiment, the establishment of this connection is carried out with the aid of a network controller of SDN-type (for "Software Defined Networking") technology.

In parallel, in a step F1, the access gateway 30 receives the message M5 requesting establishment of a service tunnel 41 and triggers the establishment with the termination point 40 of the tunnel identified by its tunnel termination identifiers TEP (for "Tunnel End Point"). In a known manner, a tunnel is identified by a source IP address (also called local IP address of the tunnel) and by a destination IP address (also called remote IP address of the tunnel) or a destination domain name FQDN (for "Fully Qualified Domain Name"). The tunnel can also be characterized by a tunnel type (e.g. GRE, VxLAN, etc. . . . ) and one or more optional identifiers (e.g. "GRE key" or VNI for "VxLAN Network Identifier", quality of service). Service tunnel configuration is not further detailed here, the latter forming part of the knowledge of the person skilled in the art. The tunnel 41, once configured between the access gateway 30 and the termination point 40, is represented in FIG. 2a in the form of a solid line between the access gateway 30 and the termination point 40.

Returning to step H1, the control device 50 commands the termination point 40 through a message M4 to associate the service tunnel having as source the access gateway 30 of the local area network with the transport network 42, making it possible to reach the instance of the service specific to the local area network.

In a step G1, the termination point 40 receives the message M4 and associates in the transport plane the service tunnel established with the access gateway 30 (identified in particular by the source IP address of the tunnel) with the transport network 42 specific to the client, which makes it possible to reach the instance of the service specific to the local area network.

Once this association has been performed, the termination point 40 routes data originating from the local area network 3 and received by means of the service tunnel 41 to the physical machine 21 on which the virtualized instance executing the service has been created and vice versa. Thus, the instance of the service specific to the local area network, and in this embodiment the virtualized instance executing the service, can access the local area network 3 as a device physically located in the local area network. It is thus possible to set up a service in the local area network without major modification of the firmware of the access gateway 30. This setup is performed in real time and on request. On completion of this step, the phase φ1 of integration into the local area network of an instance of the service specific to the local area network and located in the wide area communication network is terminated.

It is emphasized here that steps H1 and F1 are described above as executing in a sequential manner. No limitation is attached to this order. Steps H1 and F1 can be executed in parallel or in a reverse order.

Once the instance of the service specific to the local area network has been integrated into the local area network, a phase φ2 of allocation of an address of the local area network begins.

In a particular embodiment, the instance of the service specific to the local area network requests through a message M6 an allocation of an address in the local area network and receives this address in return in a message M7. The instance of the service specific to the local area network then becomes a device of the local area network addressable in the local area network. For example, this address allocation is performed in compliance with the DHCP (for "Dynamic Host Configuration Protocol") protocol. The messages exchanged then correspond to a DHCP Discover message (M6) sent by the instance of the service, a DHCP Offer message (M7) comprising an address proposal sent by the access gateway, followed by a DHCP Request message sent by the instance of the service to request the allocation of the address acknowledged by a DHCP Ack message by the access gateway. The access gateway 30 then routes data addressed to the address allocated to the instance of the service by way of the service tunnel 41 and receives data comprising as source address this address allocated by way of the service tunnel.

The phase φ2 of address allocation in the local area network is then terminated.

Once this address has been allocated, the instance of the service executes the service in the local area network. This execution is performed through the wide area communication network and as if the instance of the service were located in the local area network. It is therefore possible for it to interact with the other devices of the local area network and with the wide area communication network.

In the embodiment described, the service tunnel 41 between the access gateway 30 and the termination point 40 is established and configured on request of a management application. In another particular embodiment, the service tunnel 41 is configured on the termination point 40 and the access gateway 30 when setting up the latter. The service tunnel is thus configured in a permanent manner.

In the embodiment described, the instance of the service specific to the local area network is created on the physical machine 21 subsequent to the reception by the control device 50 of a request for provision of a diagnostic service for the local area network, that is to say of the message M1. In another particular embodiment, the instance of the service specific to the local area network is already created and the control device 50 provides only the parameters necessary to establish a connection with the termination point 40 for an execution of the service in the local area network 3.

In the embodiment described, using a virtualized infrastructure, the instance of the service specific to the local area network is a virtualized instance of the service executing on a physical machine 21.

The above description of the method is readily transposable to a particular embodiment in which the control device 50 communicates with a physical machine, able to execute a service. An instance of the service specific to the local area network is then created on this physical machine under the command of the control device 50 in step H1. The physical machine then creates in step I1 this instance of the service specific to the local area network.

In a particular embodiment, the framework of a diagnostic application of the TV service is considered with reference to FIG. 2b.

In a first exchange N1, the diagnostic application executing on the mobile terminal 33 sends a discovery query in respect of the diagnostic service on the local area network 3 in broadcast mode (or "multicast" mode) and receives in return a notification of the diagnostic service originating from the virtualized instance. Various protocols can be implemented for this first exchange: mDNS for "multicast Domain Name System" (for example Apple Hello), SSDP for "Simple Service Discovery Protocol" (used by UPnP for "Universal Plug and Play"), NetBIOS, etc. . . . . By way of illustrative example, for the SSDP protocol, the diagnostic service discovery query corresponds to an M-SEARCH message and the notification of the diagnostic service corresponds to a NOTIFY message.

Once the diagnostic service has been discovered, in a step E3, the diagnostic application commands through a message N2 the virtualized instance executing the service to start a TV diagnostic test. In this exemplary embodiment, the virtualized instance asks to rejoin a multicast group of an IPTV test channel and thus receives RTP (for "Real-time Transport Protocol") frames in return. Measurements of quality can be performed on these RTP frames. The virtualized instance receives the RTP test frames by way of the access gateway 30 as if it were located in the local area network. The test is thus performed under real operating conditions of the local area network 3.

The diagnostic application can also ask in a message N3 to receive in return a feedback image of the stream of the test channel which has been tested. This message N3 is for example a GET HTTP Test Channel Request message.

Next, once the test has been carried out, the diagnostic application requests in a message N4 stoppage of the TV diagnostic test. The various test reports prepared by the diagnostic application executing on the mobile terminal 33 and by the virtualized instance are sent for example to a utilization and maintenance entity managed by the operator. An advisor can thereafter assist the user to resolve his technical problem.

The various resources set up in the operator's network and in the computing system in the operator infrastructure can thereafter be released.

Likewise, the service tunnel can be destroyed when it is not permanent.

Another case of usage is now described. This case involves constructing a multi-site local area network. For this case of usage, the service executed by the instance specific to the local area network is a switch service allowing the routing of the data between the sites. The particular case where the sites are two in number is considered hereinafter.

In a first embodiment, the instance of the service specific to the local area network corresponds to the switch function allowing the routing of the data between the two sites. Thus, a first service tunnel is established between the first access gateway and the termination point 40 and a second service tunnel is established between the second access gateway and the termination point 40. It is emphasized here that the termination point is not necessarily the same for both these service tunnels. The control device 50 then commands the termination point to associate the connection with the first access gateway (that is to say the first service tunnel) with the instance of the service specific to the local area network. It thereafter does likewise with the second service tunnel which is associated with the same instance of the service specific to the local area network. The control device 50 also configures the address allocation function of the access gateways to avoid any conflict of IP addresses between the devices of the various sites. In a particular embodiment, an administration server, such as an ACS auto-configuration server, configures the address allocation function of the access gateways to avoid any conflict of IP addresses between the devices of the various sites. In a particular embodiment, the instance of the service specific to the local area network is instantiated directly at the level of the tunnels termination point 40. In another particular embodiment, it is accessible by way of a transport network: this therefore requires the tunnel termination point or points to associate the service tunnel of each site with a specific transport network making it possible to send the traffic to the same local service instance. It is noted that in this way the devices of the first site and those of the second site are connected as if they were co-located. No address overlap between the two local area networks is possible. A multi-site local area network is thus formed.

In a second embodiment, the address allocation function is implemented on a single access gateway out of the two access gateways available. The control device 50 then deactivates the address allocation function on the second access gateway (local DHCP) so as to replace it with for example a DHCP relay function and configures it to avoid any IP address conflict. The first access gateway then receives the address allocation requests originating from the devices of the local area network which are located in the second site and allocates them an address in return. It is noted that in this way the devices of the first site and those of the second site are connected as if they were co-located. No address overlap between the two local area networks is possible. A multi-site local area network is thus formed.

In a third embodiment, the address allocation function is furthermore implemented by an instance of the service specific to the multi-site local area network. The instance of the service specific to the local area network then plays a role of DHCP server for the devices of the local area network. The phase φ1 of integration into the local area network of an instance of the service specific to the local area network and located in the wide area communication network is firstly implemented for the first site, more precisely with the first access gateway. The connection between the first access gateway and the virtualized instance executing the address allocation service, by way of the termination point 40 and of a transport network if relevant, is established. The virtualized instance receives the address allocation requests originating from the devices of the local area network which are located in the first site and allocates them an address in return. For the DHCP protocol, the messages exchanged then correspond to a DHCP Discover message sent by a device of the local area network, a DHCP Offer message comprising an address proposal sent by the virtualized instance, these being followed by a DHCP Request message sent by the device of the local area network to request the allocation of the address acknowledged by a DHCP Ack message by the virtualized instance. To form a multi-site local area network interconnecting the local area network situated in the first site and another local area network situated in a second site, the integration phase φ1 is again implemented to configure a second service tunnel between the second access gateway of this second site and the termination point 40 and to associate the second service tunnel configured and the connection between the virtualized instance and the termination point by way of a transport network if relevant. Thus, the termination point 40 routes data originating from this second site and received by means of the second service tunnel to the physical machine 21 on which the virtualized instance executing the service has been created and vice versa. The control device 50 configures the access gateways to deactivate the local DHCP servers (which are replaced with DHCP relay functions) and to configure a private IP address specific to each of the access gateways. The virtualized instance then receives the address allocation requests originating from the devices of the local area network which are located in the second site and allocates them an address in return. It is noted that in this way the devices of the first site and those of the second site are connected as if they were co-located. No address overlap between the two local area networks is possible. A multi-site local area network is thus formed.

By way of illustrative example, for these three particular embodiments, it is then possible for a device of the first site to access a data storage device located in the second site, such as an NAS (for "Network Attached Storage") server, with the aid of protocols limited to a domestic network such as SAMBA, Netbios or else DLNA.

This case of usage has been described for a local area network formed of two sites. No limitation is associated with the number of sites that it is possible to connect in this way.

Another case of usage is now described. The service executed by the virtualized instance is a, for example parental, access control service. This service is aimed at limiting access by certain devices of the local area network to the Internet network and to the local area network. This access control allows for example a main user of the local area network to define, for a device of the local area network under control, prohibited or authorized Web sites, a quota of Internet-bound traffic (data and/or times) and/or authorized periods of use. The local area network can correspond either to a domestic network or to a company network, in which an access control rule must be applied to one or more devices. When this access control is implemented by the access gateway, the latter must then inspect all or some of the data packets that it receives from and destined for devices of the local area network, so as to detect whether or not this access is authorized. In the embodiment which is described, the access control service is implemented by a virtualized instance created on a physical machine. However, in order that this virtualized instance can perform the control of the data packets emitted by a device of the local area network under control, the packets must firstly be classified by a classification function and a routing rule corresponding to this classification is configured on the access gateway 30 to route along the tunnel data emitted by this device of the local area network under control. This routing rule can be configured locally on the access gateway 30 by means of an application programming interface API (for "Application Program Interface"), either from a device for administering the access gateway, or else from the control device 50. By virtue of this routing rule, the virtualized instance executing the access control service thus receives all the data packets emitted by the device under control corresponding to the Internet traffic and can then block, redirect or route the data packets to the Internet network. To route non-blocked data packets to the Internet network, a second virtualized instance executing an address translation service is created. More precisely, this second virtualized instance performs for the data packets, emitted by the device under control and not blocked by the access control service, a translation of the address in the local area network, termed private address, of this device to a public address associated with the access control service, in the guise of source address of the data packets. This makes it possible to prevent the data packets from traveling through the service tunnel again in order to be routed by the access gateway. The use of the resources in the operator's network is thus optimized. The data packets received in response, originating from the Internet network, have this public address associated with the access control service as destination address and are thus processed by the access control service. The address translation function replaces the destination address of the data packets with the private IP address of the device. This thereafter allows the sending of the traffic in the transport network specific to the client to the tunnels termination point and thereafter to the access gateway by way of the service tunnel. The service thus corresponds to a chaining of services, routing rule, access control and address translation to route the data packets.

In a particular embodiment, the access control service is pooled between several clients. In this case, a client identifier (for example VLAN-ID, VNI, metadata, etc. . . . ) is managed as a supplement to the device identifiers so as to isolate the clients' traffic.

The method for executing a service has been described in various embodiments for a command terminal corresponding to the mobile terminal 33, on which an application for management of the access gateway 30 is executing. This description is readily transposable to other types of command terminals. In a particular embodiment, a fault is encountered by the client. The latter initiates, from an administration device, step E1 of detecting and identifying the fault and the administration device sends a fault identification request to the control device 50 while specifying the service affected by the fault if relevant. In step H1, the control device 50 receives the fault identification request, commands the command device 20 through a message M2 to create a virtualized instance on a physical machine 21. The control device 50 also triggers a configuration of a service tunnel 41 between the access gateway 30 and the termination point 40. More precisely, the control device 50 sends to the access gateway 30 a message M5 requesting establishment of a service tunnel.

The access gateway 30 receives (step F1) the message M5 requesting establishment of a service tunnel and triggers establishment with the termination point 40 of the tunnel identified by its tunnel termination identifiers TEP. The control device 50 commands (step H1) the termination point 40 through a message M4 to associate the service tunnel having as source the access gateway 30 of the local area network with the transport network 42, making it possible to reach the instance of the service specific to the local area network. In a step G1, the termination point 40 receives the message M4 and associates in the transport plane the service tunnel identified by the source IP address of the tunnel and its tunnel termination with the transport network 42 between the termination point 40 and the instance of the service specific to the local area network. Once this association has been performed, the termination point 40 routes data originating from the local area network 3 and received by means of the tunnel to the physical machine 21 on which the virtualized instance executing the service has been created and vice versa. Once the service has been executed, the virtualized instance can send execution reports to the control device 50 and to the administration device.

In the various embodiments described, the access gateway 30 receives a service tunnel establishment request M5. The tunnel termination identifiers and the address of the termination point 40, which are called tunnel configuration parameters hereinafter, must be provided to the access gateway 30, so as to be able to configure the service tunnel. In a particular embodiment, the tunnel configuration parameters are sent to the access gateway 30 in the service tunnel establishment request. In another embodiment, the tunnel configuration parameters are provided to the access gateway 30 during its configuration in a data model describing the configuration of the service tunnel. This data model can be transmitted to the access gateway 30 by the ACS remote auto-configuration server.

Some of the embodiments which have been described present exchanges between a control device 50 and a command device 20 of a computing system in the operator infrastructure. They can be readily adapted to an environment in which the control device 50 also plays the role of the command device 20 of the computing system in the operator infrastructure.

The embodiments have been described in an environment for which the physical machine hosting the instance of the service specific to the local area network is situated remotely from the service tunnels termination point. This description is readily transposable to embodiments in which the physical machine hosting the instance of the service specific to the local area network is co-located with the service tunnels termination point, or indeed even hosted on the latter. In this case, the transport network 42 specific to the client corresponds to a local link.

The embodiments have been described for various services executing on an instance of the service specific to the local area network. No limitation is attached to these services. The method for executing a service can thus be implemented for any type of service requiring connectivity to the local area network. This method does not require any modification on the operational local area network.

Figure 3:
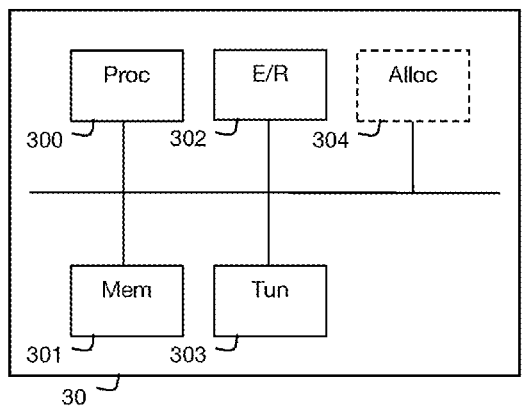
FIG. 3 represents an access gateway according to a particular embodiment.

We shall now describe an access gateway 30 in a particular embodiment with reference to FIG. 3. Such a gateway comprises in particular:
- a processor 300 for executing code instructions of software modules;
- a memory area 301, designed to store a program which comprises code instructions for implementing the steps of the method for executing a service, such as described previously;
- a storage memory, not represented in FIG. 3, designed to store data used during the implementation of the method for executing a service;
- a communication module 302, forming a communication interface with a local area network and with a communication network, designed to communicate with devices of the local area network or ones which are accessible by way of the communication network;
- a configuration module 303, designed to configure a service tunnel with a service tunnels termination point.

In a particular embodiment, the configuration module 303 is designed to configure the service tunnel when the service has to be executed.

In a particular embodiment, the access gateway 30 furthermore comprises an address allocation module 304, designed to allocate an address in the local area network to a device of the local area network. Such a module corresponds for example to a DHCP server.

In a particular embodiment, the access gateway 30 furthermore comprises a module configured to classify and route along the tunnel data emitted by a device under control of the local area network as a function of a routing rule.

It is emphasized here that the access gateway 30 also comprises other processing modules, not represented in FIG. 3, designed to implement the various functions of such a gateway.

Figure 4:
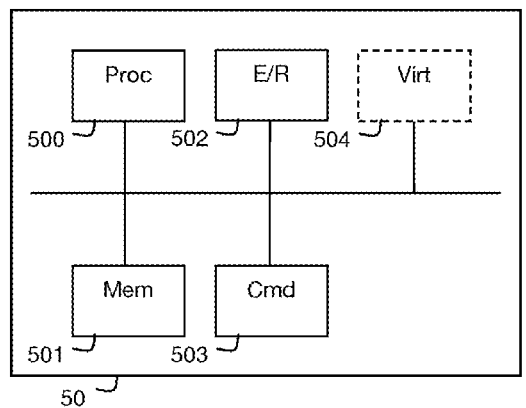
FIG. 4 represents a control device according to a particular embodiment.

We shall now describe a control device 50 in a particular embodiment with reference to FIG. 4. Such a device comprises in particular:
- a processor 500 for executing code instructions of software modules;
- a memory area 501, designed to store a program which comprises code instructions for implementing the steps of the method for executing a service, such as described previously;
- a storage memory, not represented in FIG. 4, designed to store data used during the implementation of the method for executing a service;
- a communication module 502, forming a communication interface with a communication network, designed to communicate with devices accessible by way of the communication network;
- a command module 503, designed to provide to an instance of the service specific to a local area network parameters of connection to a transport network specific to the local area network, making it possible to route data between the instance of the service and a tunnel termination point.

In a particular embodiment, the control device 50 plays the role of a command device of a virtualized infrastructure. The control device 50 then comprises a virtualization module 504, designed to create the service instance specific to the local area network in virtualized form as a function of a request for execution of the service.

It is emphasized here that the control device 50 also comprises other processing modules, not represented in FIG. 4, designed to implement the various functions of such a device.

Figure 5:
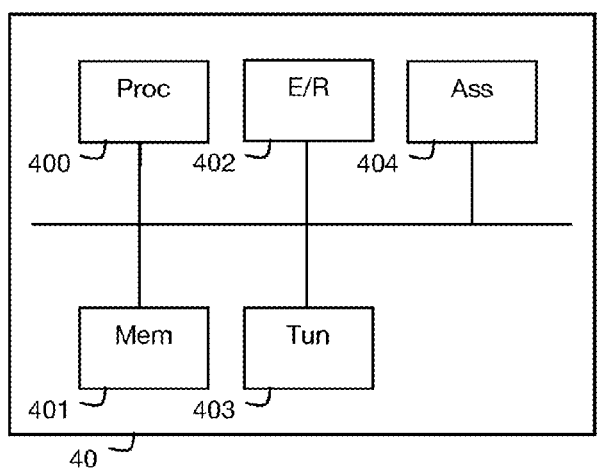
FIG. 5 represents a service tunnels termination point according to a particular embodiment.

We shall now describe a termination point 40 in a particular embodiment with reference to FIG. 5. Such a termination point comprises in particular:
- a processor 400 for executing code instructions of software modules;
- a memory area 401, designed to store a program which comprises code instructions for implementing the steps of the method for executing a service, such as described previously;
- a storage memory, not represented in FIG. 5, designed to store data used during the implementation of the method for executing a service;
- a communication module 402, forming a communication interface with a communication network, designed to communicate with devices accessible by way of the communication network;
- a configuration module 403, designed to configure the service tunnel with an access gateway;
- an association module 404, designed to route data originating from the local area network and received by means of the tunnel to an instance of a service specific to a local area network and to route data received from the instance of the service to the local area network by means of the tunnel.

In a particular embodiment, the association module 404 is in particular designed to associate the service tunnel with a transport network 42 specific to the local area network, so as to route the data.

In a particular embodiment, the termination point furthermore comprises a module for identification of the client, not represented in FIG. 5, designed to authorize establishment of a service tunnel for an access gateway 30.

It is emphasized here that the termination point 40 also comprises other processing modules, not represented in FIG. 5, designed to implement the various functions of such a termination point.

The invention relates furthermore to a system 60 for executing a service in a local area network. This system comprises in particular:
- an access gateway 30 administered by a communication network operator, by way of which devices 31-33 of the local area network access a wide area communication network, this gateway comprising a configuration module 303, designed to configure a service tunnel with a service tunnels termination point;

the termination point 40, the latter comprising:

a configuration module 403, designed to configure the service tunnel with the access gateway and an association module 404, designed to route data originating from the local area network and received by means of the tunnel to an instance of the service specific to the local area network and to route data received from the instance of the service to the local area network by means of the tunnel.

In a particular embodiment, the system 60 furthermore comprises a control device 50, this device comprising a command module 503, designed to provide to the instance of the service specific to the local area network parameters of connection to a transport network specific to the local area network, making it possible to route data between the instance of the service and the service tunnels termination point.

In a particular embodiment, the system 60 furthermore comprises a control device 50, this device comprising a virtualization module 504, designed to create the instance specific to the local area network in virtualized form as a function of a request for execution of the service.

The technique for executing a service is implemented by means of software components and/or hardware components. In this regard, the term "module" can correspond in this document either to a software component, or to a hardware component or to a set of hardware components and/or software components, able to implement a function or a set of functions, according to what is described previously for the module concerned.

A software component corresponds to one or more computer programs, one or more subprograms of a program, or more generally to any element of a program or of an item of software. Such a software component is stored in memory and then loaded and executed by a data processor of a physical entity and is liable to access the hardware resources of this physical entity (memories, recording media, communication buses, electronic input/output cards, user interfaces, etc).

In the same manner, a hardware component corresponds to any element of a hardware set. It may or may not involve a programmable hardware component, with or without integrated processor for the execution of software. It involves for example an integrated circuit, a chip card, an electronic card for the execution of firmware, etc.

In a particular embodiment, the module 303 is designed to implement the method for executing a service described previously. It preferably involves software modules comprising software instructions for executing those of the steps of the previously described method for executing a service, which are implemented by an access gateway. The invention therefore also relates to:

a program for an access gateway, comprising program code instructions intended to command the execution of those of the steps of the previously described method for executing a service, when said program is executed by this access gateway;

a recording medium readable by an access gateway on which the program for a gateway is recorded.

In a particular embodiment, the modules 503, 504 are designed to implement the method for executing a service described previously. It preferably involves software modules comprising software instructions for executing those of the steps of the previously described method for executing a service, which are implemented by a control device. The invention therefore also relates to:

a program for a control device, comprising program code instructions intended to command the execution of those of the steps of the previously described method for executing a service, when said program is executed by this control device;

a recording medium readable by a control device on which the program for a control device is recorded.

In a particular embodiment, the modules 403, 404 are designed to implement the method for executing a service described previously. It preferably involves software modules comprising software instructions for executing those of the steps of the previously described method for executing a service, implemented by a service tunnels termination point. The invention therefore also relates to:

a program for a termination point, comprising program code instructions intended to command the execution of those of the steps of the previously described method for executing a service, when said program is executed by this termination point;

a recording medium readable by a termination point on which the program for a termination point is recorded.

The software modules can be stored in or transmitted by a data medium. The latter can be a hardware storage medium, for example a CD-ROM, a magnetic recording means, for example a magnetic diskette or a hard disk. Moreover, the data medium can be a transmission medium such as an electrical, optical or radio signal, which can be conveyed via an electrical or optical cable, by radio or by other means. The program code instructions may in particular be downloaded over a network of Internet type.

Alternatively, the data medium can be an integrated circuit in which the program is incorporated, the circuit being adapted to execute or to be used in the execution of the method for executing a service described previously.

Although the present disclosure has been described with reference to one or more examples, workers skilled in the art will recognize that changes may be made in form and detail without departing from the scope of the disclosure and/or the appended claims.

The invention claimed is:

1. A method comprising:

executing a service in a local area network through a wide area communication network, by way of an access gateway allowing devices of the local area network to access the wide area network, said executing comprising:

configuring by the access gateway a service tunnel between the access gateway and a tunnels termination point, wherein said tunnels termination point routes data originating from the local area network and received by using the service tunnel to an instance of the service specific to the local area network, wherein said tunnels termination point routes data received from said instance; to the local area network by using the service tunnel and wherein said service tunnel transfers the data between the local area network and said instance at a level of a data link layer;

executing said service by said instance in the guise of a device of the local area network, wherein said instance is executed on a physical device located in the wide area communication network.

2. The method as claimed in claim 1, said method furthermore comprising provisioning by a control device parameters of connection to a transport network, which is specific to the local area network, wherein said parameters are provided to said instance to establish a connection between said instance and said tunnels termination point by way of said transport network to route data between said instance and the tunnels termination point.

3. The method as claimed in claim 1, said method furthermore comprising allocating by the access gateway an address in the local area network to said instance.

4. The method as claimed in claim 1, in which the service tunnel is configured by the access gateway when the service has to be executed.

5. The method as claimed in claim 1, comprising creating by a control device said instance as a function of a request for execution of the service.

6. The method as claimed in claim 1, in which, the service corresponds to a string of services and a routing rule is configured on the access gateway to route along the tunnel data emitted by a device of the local area network under control.

7. The method as claimed in claim 1, in which to form a multi-site local area network interconnecting said local area network and another local area network, said instance implements a switch function allowing routing of the data between the sites of the multi-site local area network.

8. The method as claimed in claim 7, in which said instance furthermore implements an address allocation function.

9. A system for executing a service in a local area network through a wide area communication network, said system comprising:
    an access gateway, which comprises a first processor and a first non-transitory computer-readable medium comprising instructions stored thereon, which when executed by the first processor configure the access gateway to:
        allow devices of the local area network to access the wide area network, and
        configure a service tunnel with a service tunnels termination point; and
    said termination point, which comprises a second processor and a second non-transitory computer-readable medium comprising instructions stored thereon, which when executed by the second processor configure the termination point to:
        configure the service tunnel with the access gateway,
        route data originating from the local area network and received by using the service tunnel to an instance of the service specific the local area network, and
        route data received from said instance; to the local area network by using the service tunnel,
        wherein said service tunnel transfers the data between the local area network and said instance at a level of a data link layer, and
        wherein said instance is executed on a physical device located in the wide area communication network.

10. The system as claimed in claim 9, furthermore comprising a control device, said device comprising:
    a third processor and a third non-transitory computer-readable medium comprising instructions stored thereon, which when executed by the third processor configure the control device to:
        provide, to said instance, parameters of connection to a transport network that is specific to the local area network, wherein said parameters are provided to said instance to establish a connection between said instance and said termination point by way of said transport network to route the data between said instance and the termination point.

11. The system as claimed in claim 9, furthermore comprising a control device, said device comprising:
    a third processor and a third non-transitory computer-readable medium comprising instructions stored thereon, which when executed by the third processor configure the control device to:
        create the instance specific to the local area network in virtualized form as a function of a request for execution of the service.

12. The system as claimed in claim 9, in which the access gateway is furthermore configured to classify and route along the tunnel data emitted by a device of the local area network under control as a function of a routing rule.

13. Non-transitory recording mediums comprising respective instructions stored thereon, which when executed by a processor of an access gateway and a processor of a device implementing an instance of a service specific to a local area network, configure the access gateway and the device to execute the service in the local area network through a wide area communication network, wherein:
    the instruction configure the access gateway to allow devices of the local area network to access the wide area communication network; and to configure a service tunnel between the access gateway and a tunnels termination point, wherein said tunnels termination point routes data originating from the local area network and received by using the service tunnel, to the instance of the service specific to the local area network, and, wherein said tunnels termination point routes data received from said instance to the local area network by using the service tunnel, and wherein said service tunnel transfers the data between the local area network and said instance at a level of a data link layer; and
    the device implementing the instance is configured to execute said service by said instance in the guise of a device of the local area network, wherein said instance is executed on a physical device located in the wide area communication network.

* * * * *